US 7,177,916 B2

(12) United States Patent
McDonough et al.

(10) Patent No.: US 7,177,916 B2
(45) Date of Patent: Feb. 13, 2007

(54) METHODS AND SYSTEMS FOR SELECTING AND MANAGING NETWORK-ACCESSIBLE ACCOUNTS

(75) Inventors: John McDonough, Nahant, MA (US); Michelle O'Brien, Manomet, MA (US); Stephen Carr, Manchester, MA (US); Mihir Shah, Burlington, MA (US)

(73) Assignee: FMR Corp., Boston, MA (US)

( * ) Notice: Subject to any disclaimer, the term of this patent is extended or adjusted under 35 U.S.C. 154(b) by 97 days.

(21) Appl. No.: 10/606,904

(22) Filed: Jun. 26, 2003

(65) Prior Publication Data
US 2004/0267905 A1 Dec. 30, 2004

(51) Int. Cl.
*G06F 15/16* (2006.01)
(52) U.S. Cl. ............. 709/217; 709/223; 709/224; 709/225
(58) Field of Classification Search .......... 709/200, 709/223–226, 1, 35–36; 705/35–42; 235/379
See application file for complete search history.

(56) References Cited

U.S. PATENT DOCUMENTS

| 4,317,957 | A | * | 3/1982 | Sendrow ............... 705/71 |
| 6,138,107 | A | * | 10/2000 | Elgamal ................ 705/39 |
| 2002/0019810 | A1 | * | 2/2002 | Kumar et al. ........... 705/42 |
| 2002/0194502 | A1 | * | 12/2002 | Sheth et al. ............ 713/201 |
| 2003/0120571 | A1 | * | 6/2003 | Blagg .................... 705/35 |

* cited by examiner

*Primary Examiner*—Jeffrey Pwu
(74) *Attorney, Agent, or Firm*—Fish & Richardson P.C.

(57) ABSTRACT

Techniques by a first entity that include determining, by a first entity and using the data associated with the user, a list of one or more entities that provide network-accessible accounts, enabling the user to select a second entity from the list of one or more entities, and enabling the user to provide access information for a network-accessible account that is provided by the second entity.

42 Claims, 10 Drawing Sheets

Company_A

You can now begin to set up your accounts in Full View. There is no limit to the number of accounts you can add, and you can add new accounts at any time.

Before you begin, you'll want to gather User Names and Passwords for any online account you'd like to add to Full View. You can also use Full View to establish online access to your accounts.

Our "Account Setup Wizard" will assist you with this process by identifying your Company_A accounts as well as other popular accounts for your selection. It's easy and quick to use.

Otherwise, click "Go to Full View" to get started on your own.

302 — Account Setup Wizard    Go to Full View — 304

Step 1: Company_A Investment Accounts....
Please select the Company_A accounts you wish to add to Full View:

Company_A Personal Investing
☐ Acct: Y0123456601   $20,451.00
☐ Acct: T131313112    $ 5,024.14
☐ Acct: ABCI12345     $ 2,025.46

Company_A NetBenefits
☐ Acct: Profit Sharing –81111   $10,250.00

Company_A Charitable Gift Fund
☐ Acct: CGF136348     $   340.24

☐ Company_A Bill Pay

[Continue with Wizard]   [Go to Full View]

ACCOUNT SETUP WIZARD

FIG. 4

Step 2: Other Accounts....
Please select the accounts you wish to add to Full View:
- ☐ Financial_A
- ☒ Financial_B
- ☐ Financial_C
- ☐ Bank_A
- ☒ Bank_B Online
- ☐ Bank_C
- ☐ Creditcard_A
- ☒ Creditcard_B
- ☐ Airline_A Miles
- ☐ Email_A

[Continue with Wizard] [Go to Full View]

ACCOUNT SETUP WIZARD

Step 2a: Other Investment Accounts....
Please select the investment accounts you wish to add to Full View:

☒ Financial_A
☐ Financial_B
☐ Financial_C
☐ Broker_A
☐ Bank_A Investments
☐ Broker_B

[Continue with Wizard]  [Go to Full View]

ACCOUNT SETUP WIZARD

Step 2b: Other Financial Accounts.....
Please select the accounts you wish to add to Full View:

- ☐ Bank_A
- ☒ Bank_B Online
- ☐ Bank_C
- ☒ Credit_Card_A
- ☐ Credit_Card_B
- ☒ Credit_Card_C
- ☐ Credit_Card_D

[ Continue with Wizard ]   [ Go to Full View ]

ACCOUNT SETUP WIZARD

Step 2c: Other Accounts....
Please select the investment accounts you wish to add to Full View:

☒ Airlines_A Miles
☐ Airlines_B Miles
☐ Airlines_C Miles
☐ Email_A
☐ Email_B

[Finish Wizard]

METHODS AND SYSTEMS FOR SELECTING AND MANAGING NETWORK-ACCESSIBLE ACCOUNTS

TECHNICAL FIELD

This invention relates generally to managing network-accessible accounts.

BACKGROUND

Institutions running servers on networks manage network-accessible accounts. These institutions also maintain databases that store the information pertinent to these network-accessible accounts. The servers connect to these databases to enable users to securely access these accounts over the networks and read or modify account information in the databases.

Such network-accessible accounts are financial or non-financial. These accounts can be provided by different institutions. A comprehensive view of network-accessible accounts is useful to a user because, in the case of financial accounts, it enables a user to view a consolidated snapshot of all of the user's finances. For non-financial accounts, it enables a user to consolidate the information from these non-financial accounts. For non-financial accounts such as email accounts, this enables a user to view all emails from different email providers. This comprehensive view is achieved by aggregating the information about the user's accounts into one location. Typically the user enters in the URL, or some similar type of address, so that an aggregating service can locate the account.

Account access code generally refers to information that is required to gain access (e.g., user credentials) to a network-accessible account managed by a server over a network. This code is typically a user identifier and an authenticator. Given such account access information, a web-enabled program can automatically go out on a network and periodically collect high-level information about each network-accessible account. Subsequently, the program displays the high-level information to the user when the user logs into the server that provides the comprehensive view of his or her aggregated accounts.

A user interface wizard generally refers to a utility that helps a user perform a certain task with a software user interface. The utility typically guides the user through a series of steps. A utility generally refers to a program included in a larger application that uses software to perform a specific job.

SUMMARY

In general, in one aspect, a method includes determining, by a first entity and using data associated with a user, a list of one or more other entities that provide network-accessible accounts, enabling the user to select a second entity from the list of one or more other entities, and enabling the user to provide access information for a network-accessible account that is provided by the second entity.

Embodiments may include one or more of the following. Determining the list further includes determining personalization data associated with the user. The personalization data includes a characteristic shared by a pre-defined group of users. The characteristic includes one of a geographical location, a type of computer, a type of operating system, a pattern of web navigation, and an amount of money in a financial account. Determining the personalization data further includes providing a personalization test to the user and analyzing one or more answers of the user from the personalization test. Determining the personalization data further includes automatically collecting a characteristic associated with the user. Enabling the user to select a second entity further includes displaying the list of one or more entities to the user. Determining further includes determining one or more entities that have a relation to the first entity. Determining one or more entities that have a relation to the first entity further includes identifying the one or more entities that have the relation to the first entity and ordering the list based on the relation. The relation includes competition. The relation includes a partnership. The access information includes a user identifier for the account and an account authenticator. The access information for the network-accessible account makes the network-accessible account automatically accessible over a network. The data about the user includes at least one of a name, a geographic location, a computer system used by the user, and a history of web-navigation. The method further includes providing one or more accounts to the user. The data associated with the user includes information about the accounts provided by the first entity. The information includes a balance of a first account provided by the first entity. The method further includes adding the network-accessible account to an aggregation of accounts. The method further includes enabling the user to select a first account provided by the first entity and adding the first account to the aggregation of accounts. The first entity includes a financial institution, the method further including providing, by the first entity, one or more financial accounts to the user. Enabling the user to select a second entity further includes enabling the user to select a second entity including a financial institution from the list of one or more entities that provide financial accounts. Enabling the user to select a second entity further includes enabling the user to select a second entity from the list of one or more entities that provide email accounts, frequent flier accounts, or calendar accounts.

In general, in another aspect, a system includes a server, a database managed by a first entity, a web page interface to the first server, and a program configured by a first entity to access data associated with a user from the database, determine, using the data associated with the user, a list of one or more entities that provide network-accessible accounts, enable the user to select a second entity from the list of one or more entities, and enable the user to provide access information for a network-accessible account that is provided by the second entity.

Embodiments may include one or more of the following. The program is further configured to provide a personalization test to the user and analyze one or more answers of the user from the personalization test. The personalization test includes a characteristic shared by a pre-defined group of users. The program is further configured to display the list of one or more entities to the user. The program is further configured to identify one or more entities in the list whose business has a relation to the business of the first entity and prioritize the identified one or more entities in the display of the list. The relation includes competition. The relation includes a partnership. The access information includes a user identifier for the account and an account authenticator. The access information for the network-accessible account makes the network-accessible account automatically accessible over a network. The data about the user includes at least one of a name, a geographic location, a computer system used by the user, and a history of web-navigation. The first entity provides one or more accounts to the user.

The data associated with the user includes information about the accounts provided by the first entity. The information includes a balance of a first account provided by the first entity. The program is further configured to add the network-accessible account to an aggregation of accounts. The program is further configured to enable the user to select a first account from the accounts provided by the first entity and add the first account to the aggregation of accounts. The first entity includes a financial institution and the first entity provides one or more financial accounts to the user. The program is further configured to enable the user to select a second entity that includes a financial institution from the list of one or more entities that provide financial accounts. The program is further configured to enable the user to select a second entity from the list of one or more entities that provide email accounts, frequent flier accounts, or calendar accounts.

In another aspect, there is an article that includes a machine-readable medium storing instructions operable to cause one or more machines to perform operations including determining, by a first entity using data associated with a user, a list of one or more other entities that provide network-accessible accounts, enabling the user to select a second entity from the list of one or more other entities, and enabling the user to provide access information for a network-accessible account that is provided by the second entity.

One or more of the following advantages may be provided by one or more aspects of the invention.

Using an add-an-account user interface wizard, customers can easily add financial and other types of accounts to a network-accessible database application that provides a high-level, comprehensive view of their network-accessible accounts. Customers are more likely to add their accounts to this high-level, comprehensive view if a user interface wizard can guide them through the process of adding an account. The list of institutions presented to the customer to enter account information for inclusion of accounts to the comprehensive view may be tailored to the customer based on previously recorded information about the customer, on choices made by other customers, on the goals of the institution providing the wizard, and/or on other similar factors. In this way, the customer may not need to search for the site or account name to add to his or her comprehensive view of accounts if, for example, the user interface wizard presents the customer with institutions most likely to be added to the comprehensive view by the customer. In other words, the account wizard can automatically determine where (e.g., URL) the accounts are located, and which accounts are available for aggregating, and enable the user to add them by simply selecting them (e.g., using a checkbox) from a list.

As more customers add accounts to their financial summaries and more institutions are presented to the customers to add accounts to their comprehensive view, the financial organization may obtain more complete records of accounts held by their customers. Such records may help the financial institution cater and offer new services to particular customers.

The add-an-account user interface wizard can help simplify the process where a user enters access information for network-accessible accounts over a network. By guiding the user through adding an account for such access, the user may be more likely to patronize the services of an entity offering the add-an-account wizard to add accounts, while the entity may obtain more information about the user.

Other advantages will be apparent from the following description and from the claims.

DESCRIPTION OF DRAWINGS

FIG. 3 shows an account introduction screen.

FIGS. 4–8 show screens from which users may add accounts.

DETAILED DESCRIPTION

Figure 1:
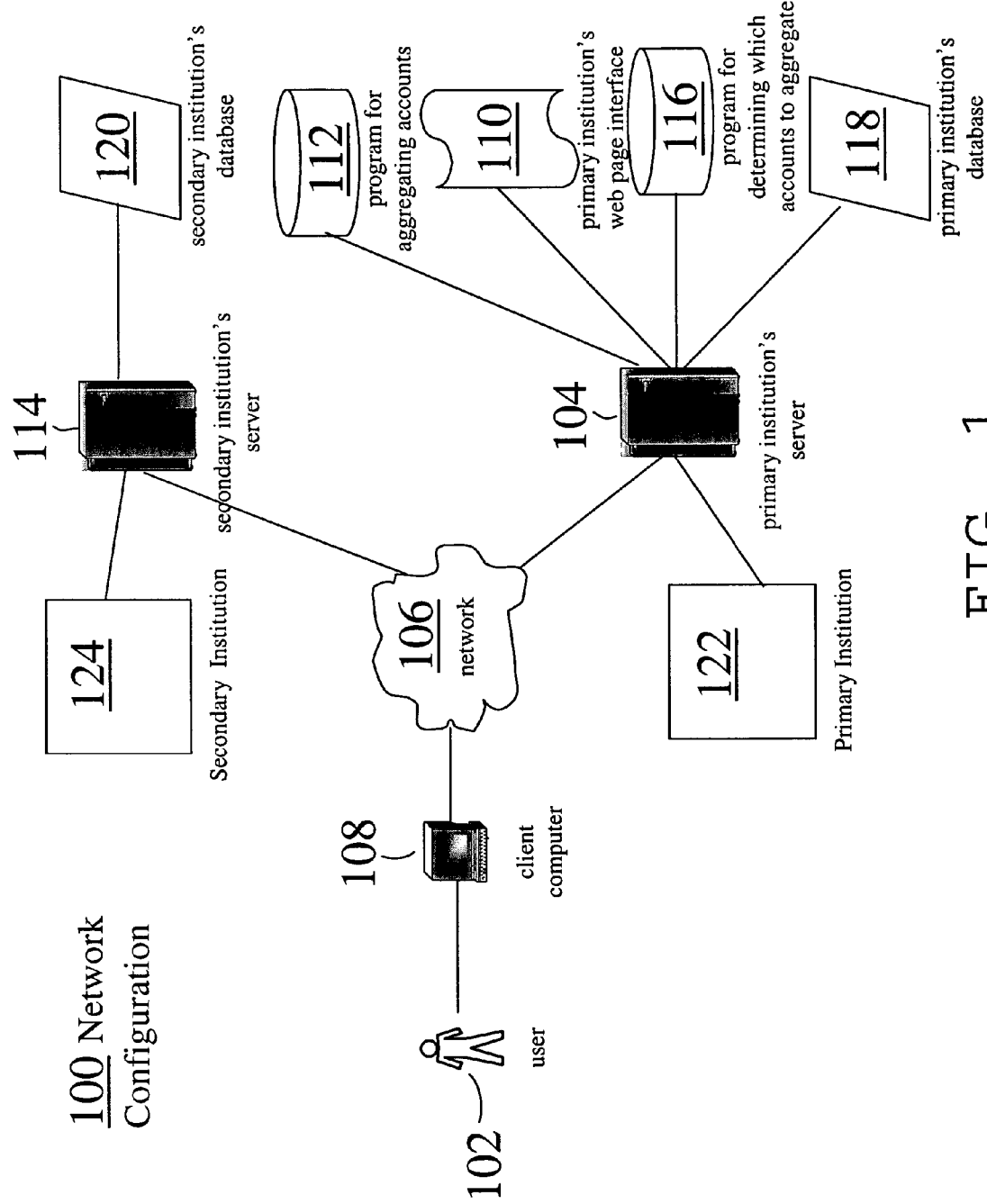
FIG. 1 shows a network configuration.

Referring to FIG. 1, a network configuration 100 includes an institution 122 that provides network access to account information to user 102 through server 104. Database 118 includes information concerning accounts managed by institution 122. These accounts include a variety of accounts managed by, for example, financial institutions. For instance, these include credit card accounts issued by banks, savings and loan institutions, retail stores, gas companies, and other similar entities. Other financial accounts include bank accounts, mutual fund accounts, brokerage accounts, insurance accounts, loan and mortgage accounts, and direct billing accounts. Non-financial accounts can include frequent flier mileage, email accounts, and calendar accounts. In the case of financial accounts, the information concerning these accounts includes summaries of financial status. In the case of email accounts, access to account information includes accessing all functionality associated with the account such as viewing current emails waiting in the inboxes of this account and enabling the user to send email from the account. In the case of calendar accounts, the information includes all relevant information in the calendar. User 102 accesses his or her account information by using client computer 108 to connect with server 104 over a network 106 using an access code. This access code typically consists of an identifier (e.g. a name or number) and an authenticator (e.g. password).

Program 112 provides user 102 with a high-level, comprehensive view of his or her network-accessible accounts managed by institution 122. This comprehensive view includes useful information about the accounts. Program 112 is accessible at or through server 104 using, for example, web page 110 as a user interface. The comprehensive view of the accounts is provided through communication with server 104 over network 106. This comprehensive view allows user 102 to access and view details of various network-accessible accounts managed by institution 122. This comprehensive view also can include accounts managed by other institutions such as institution 124, as described in more detail below.

Program 116 works in coordination with program 112 and provides an interface to user 102 so that user 102 can choose which accounts managed by institution 122 to add to the comprehensive view of accounts. The interface also enables user 102 to create a list of accounts managed by other institutions, such as 124, to add to the comprehensive view of accounts as well as the relevant access codes. Based on a variety of factors, as described in more detail below, program 116 estimates which institutions, such as institution 124, are most likely to manage network-accessible accounts for user 102. These factors include information known to institution 122 as a consequence of the business relationship between user 102 and institution 122 and, as an option, answers provided by user 102 to questions in a personalization test in the interface. The interface provided by program 116 presents user 102 with a list of likely institutions, such as institution 124, that are most likely to manage network-accessible accounts for user 102. From this list of likely institutions, user 102 selects the institutions that manage network-accessible accounts for user 102. For each of these institutions, program 116 presents a user interface window that enables user 102 to enter in access information for accounts managed by each institution.

User 102 communicates with server 104 using client 108, a device capable of communicating with server 104 over network 106. Institution 122, which already manages some of the accounts of user 102, typically maintains, controls, and otherwise provides server 104, although the actual provider of server 104 can include any entity authorized by institution 122 to provide server 104.

Client 108 accesses web page 110 that is provided or supported by server 104. User 102 adds his or her accounts to a comprehensive view through web page 110 using, for example, an Internet protocol and programs 112 and 116. Programs 112 and 116 include any software and/or hardware mechanisms that the server 104 uses in implementing web page 110 and providing services to client 108 and user 102. For managing the comprehensive view of information about the accounts of user 102, programs 112 and 116 have access to database 118, which stores, for example, the uniform resource locators (URL) of each network-accessible account in the comprehensive view. Database 118 also stores access codes of each network-accessible account in the comprehensive view. To manage the comprehensive view of account information to user 102, programs 112 and 116 retrieve current information for accounts managed by institution 122 in database 118. Programs 112 and 116 also can make requests over network 106 through server 114 to access information for accounts owned by user 102 and managed by institution 124 in database 120.

Since information in database 120 is restricted to entities with access privileges, program 112 uses an access code provided by user 102 to gain network-accessible access to current information for accounts managed by institutions such as institution 124. Subsequent to providing the access code, program 112 collects the current information for these accounts. In some implementations, program 112 performs "screen scraping" that translates the data coming from database 120 into a form that is useful for presenting on web page interface 110. This current information is then added to the comprehensive view of account information that is displayed to user 102.

The elements in network configuration 100 can be implemented in a variety of ways. Network 106 includes any kind and any combination of networks such as an Internet, a local area network (LAN) or other local network, a private network, a public network, a plain old telephone system (POTS), or other similar wired or wireless networks. Communications through network 106 may be secured with a mechanism such as encryption, a security protocol, or other type of similar mechanism.

Client 102 includes any device capable of communicating with network 106. Examples of such devices include a mobile computer, a stationary computer, a workstation, a server, a telephone, a pager, a keypad, a personal digital assistant (PDA), and other similar devices. Client 102 accesses web page 110 via an Internet browser. The browser can be any application able to display and/or execute applications such as web pages, media files, and programs accessed through network 106, such as Netscape Navigator®, Microsoft Internet Explorer®, and other similar applications.

Servers 104 and 114 can each include any device capable of communicating with network 106 such as a file server, an application server, a mobile computer, a stationary computer, and/or other similar device. Servers 104 and 114 can be associated with any type of entity: financial, corporate, individual, non-profit, educational, and the like.

Web page 110 includes one or more web pages, each accessible through one or more uniform resource locators (URLs) or other names or addresses. Web page 110 is not limited to any particular layout or configuration or to any particular protocol.

Programs 112 and 116 include any software and/or hardware mechanism that server 104 uses in interacting with web page 110 and providing services to client 108 or user 102. Examples of programs 112 and 116 include routines, applications, and other similar mechanisms. Programs 112 and 116 can be included in server 104 (e.g., as a stand-alone application or as part of another application) or otherwise be accessible to server 104 (e.g., be included on a network accessible by the server 104). Similarly, programs 112 and 116 can exist as a single program (not shown).

Databases 118 and 120 include any type of storage mechanism such as a data queue, a buffer, a local or remote memory device, a cache, or other similar storage mechanism. Database 118 may be organized as one or more databases. Database 118 may be included in server 104 rather than exist as a separate element from server 104 as shown in network configuration 100. Similarly, database 120 may be included in server 114 rather than exist as a separate element from server 114 as shown in network configuration 100.

Elements included in network configuration 100 can communicate with other element(s) included in network configuration 100 over one or more communication links. These communication links can include any kind and any combination of communication links such as modem links, Ethernet links, cables, point-to-point links, infrared connections, fiber optic links, wireless links, cellular links, Bluetooth®, satellite links, and other similar links.

Furthermore, network configuration 100 is simplified for ease of explanation. Network configuration 100 can include more or fewer additional elements such as networks, communication links, proxy servers, firewalls or other security mechanisms, Internet Service Providers (ISPs), gatekeepers, gateways, switches, routers, hubs, client terminals, and other elements.

Figure 1A:
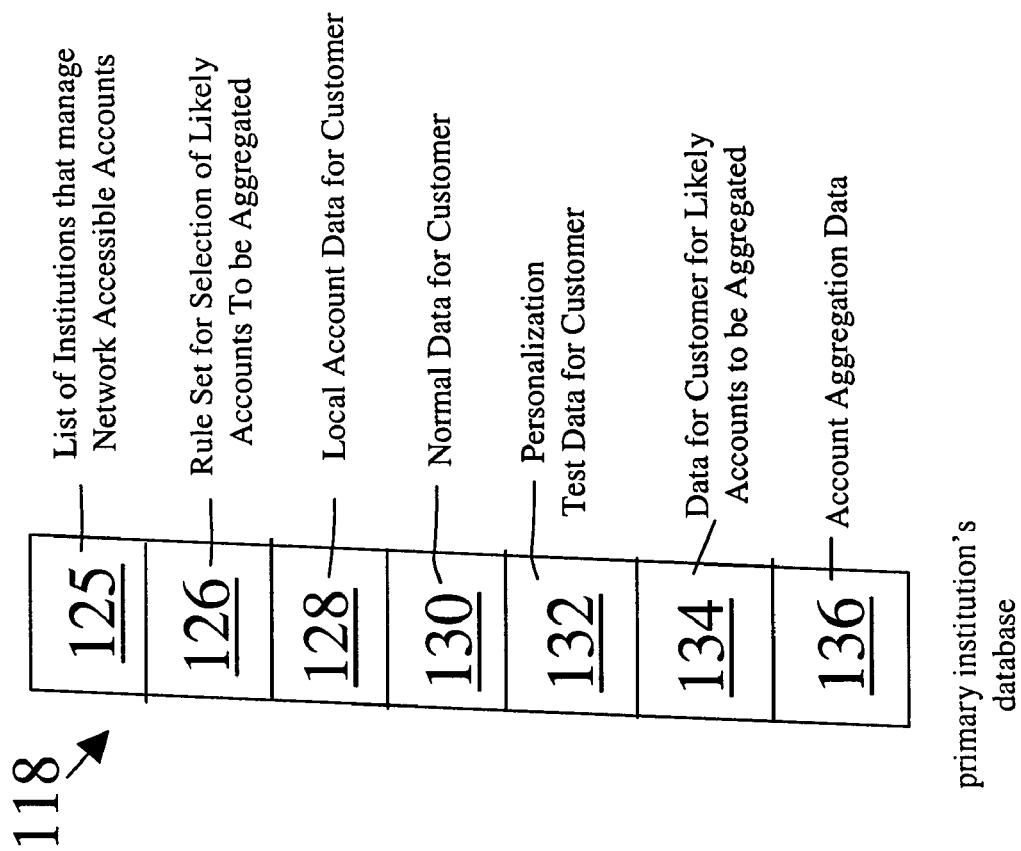
FIG. 1A shows a database.

Referring to FIG. 1A, database 118 includes data table 125 containing a list of institutions other than institution 122 that manage network accessible accounts. Data table 126 holds a rule set for all customers of institution 122 to enable program 116 to select a sublist of the list in data table 125 of institutions likely to manage network accessible accounts for a particular user 102. Rule set 126 is described in more detail below. Database 118 also includes data tables 128, 130, 132, 134, and 136 for each user 102 who is a customer of institution 122. Data table 128 contains normal local account data for user 102. Data table 132 contains information extracted from a personalization test that is described in more detail below. Data table 134 contains lists of institutions other than institution 118 that are likely to manage accounts for user 102. These lists are described in more detail below. Data table 136 contains the list of accounts, both managed by institution 118 and other institutions such as institution 124, that are aggregated into a comprehensive view for user 102.

An example of program 112 is Full View$^{SM}$ from Fidelity Investments of Boston, Mass. Full View$^{SM}$ includes a comprehensive view of financial accounts, including investment accounts and credit card accounts, a comprehensive view of individual investments corresponding to the investment accounts, a comprehensive view of calendar events from different calendar accounts, and a comprehensive view of emails from different email accounts.

Figure 2:
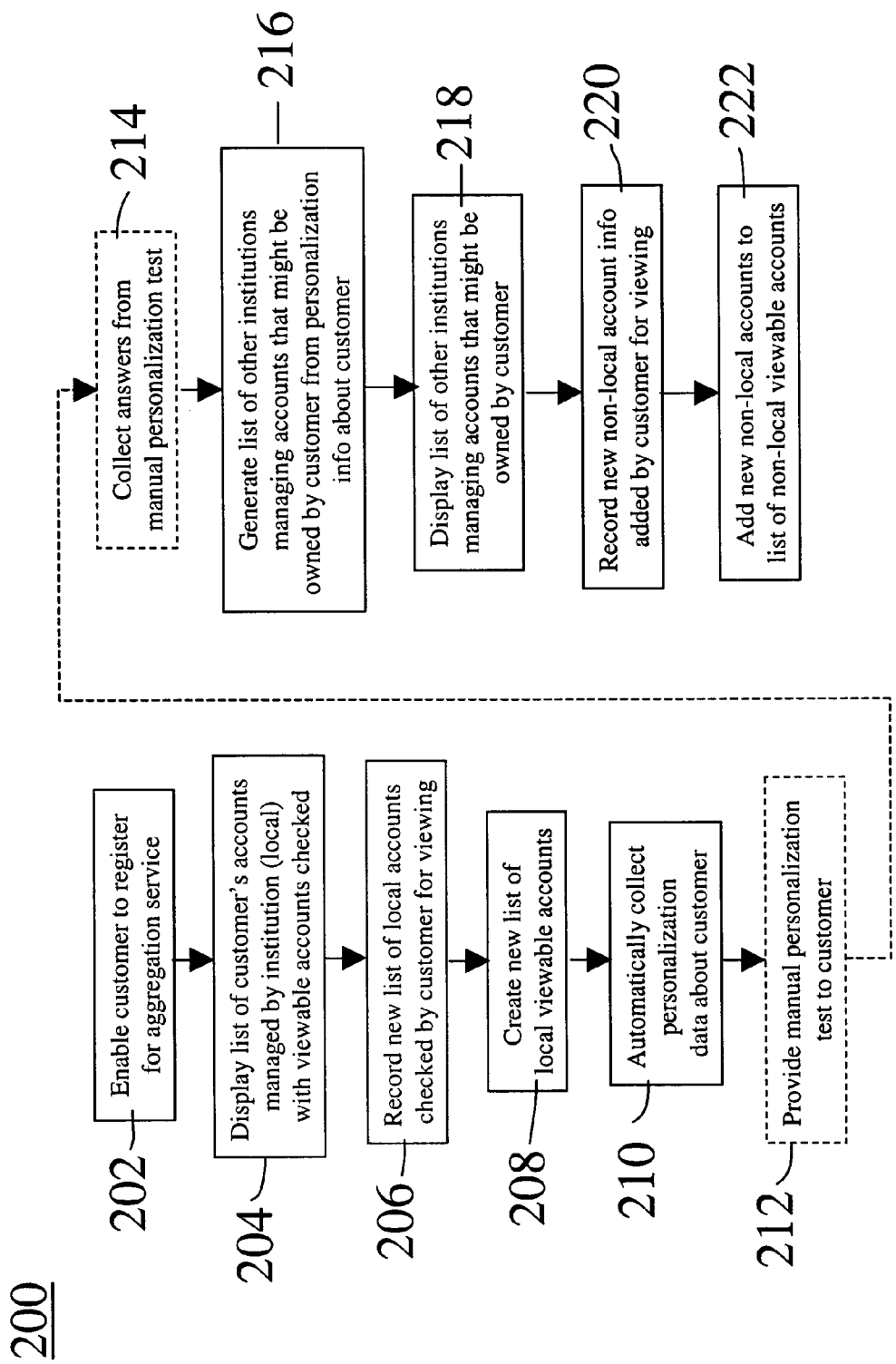
FIG. 2 is a flowchart showing a process of adding accounts to a comprehensive view.

Referring to FIG. 2, process 200 is implemented by program 116 to enable user 102 to add accounts to a high-level comprehensive view of his or her accounts. Process 200 enables (202) user 102 to register for the aggregation service provided by institution 122. After registering for the aggregation service, FIG. 3 shows example user interface 300 that appears to user 102. At any time during process 200, user 102 has the option to use program 116 (e.g., account wizard) to aggregate more accounts by clicking on "Account Setup Wizard" box 302 or user 102 may aggregate more accounts manually or stop aggregating more accounts by clicking on "Go to Full View" box 304.

Continuing with FIG. 2, process 200 displays (204) a list of accounts associated with user 102 that are managed by institution 122. Displaying (204) includes providing user 102 with an indicator indicating if any of the accounts are already on a list of accounts for the comprehensive view. FIG. 4 shows an example display 306 with the list of financial accounts having checkboxes 307 to the left of each account name 309. Account balances 310 to the right of each account name helps user 102 distinguish between different accounts. Display 306 appears to user 102 with checkboxes 307 checked if the account with name 309 is already on the list of accounts for the high-level comprehensive view. User 102 clicks on checkboxes 307 for each account that user 102 wishes to add to the list of accounts for the high-level comprehensive view, if checkbox 307 does not already contain a check. User 102 may also click on already checked boxes to remove a given account from the list of accounts for the high-level comprehensive view.

Continuing with FIG. 2, process 200 records (206) a new list of accounts selected by user 102 for the high-level comprehensive view in data table 136.

Process 200 automatically collects (210) personalization data about user 102 based on information accessible to institution 122 in accordance with the relationship user 102 has with institution 122. This collection is described in more detail below. Process 200 optionally can also provide (212) a personalization test to user 102. The personalization test is described in more detail below. If provided, process 200 collects data from the responses of user 102 to this personalization test. Process 200 uses the automatically-collected personalization data as well as the responses from the personalization test, if applicable, and a rule set to generate (216) a listing of institutions with network-accessible accounts with which user 102 might be associated.

Process 200 displays (218) a list of other institutions such as institution 124 that manage accounts possibly owned by user 102. FIG. 5 shows an example of display 312 that shows a list of institutions generated by program 116. In this example, user 102 has selected institutions Financial$_{13}$B, Bank$_{13}$B Online, and Creditcard$_{13}$B. In FIGs. 6,7, and 8, another example is shown where institutions such as 124, are presented in separate displays 314, 316, and 318, that are grouped, for example, according to the type of institution. Display 314 shows investment accounts. Display 316 shows financial accounts other than investment accounts. Display 318 shows other accounts such as frequent flier accounts and email accounts. How the list of institutions is presented to user 102 using different displays is configurable and dependent on the needs of institution 122 providing the account wizard service as described in more detail below.

Figure 9:
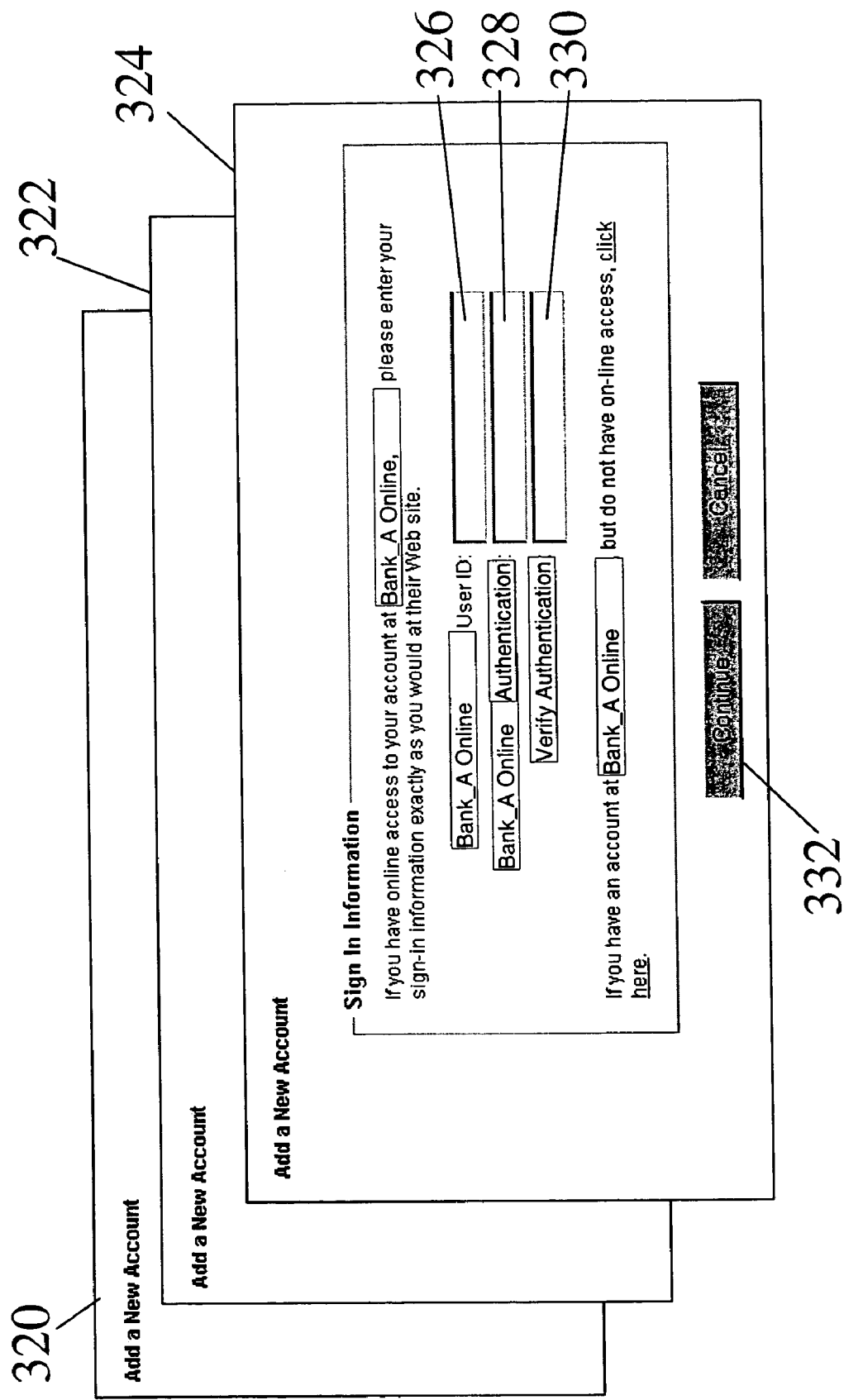
FIG. 9 shows account sign-in screens.

Continuing with FIG. 2, process 200 records (220) access code information for network-accessible accounts managed by other institutions such as 124. FIG. 9 shows an example of three displays 320, 322, and 324 for recording such access code information. Display 324 enables user 102 to enter access information for a Bank$_{13}$A Online account. User 102 types in user ID in box 326, authenticator in box 328, and authenticator again in box 330. When user 102 finishes entering data, user 102 clicks on button 332 titled "Continue" to indicate to program 116 to record the data. Process 200 continues by adding (222) the information about these accounts owned by other institutions (e.g., 124) to the account list for the comprehensive view.

On a periodic basis, program 112 collects the information pertaining to accounts in the account list generated by process 200, puts the data in data table 136, and, upon request of user 102, displays the information resulting in a high-level comprehensive view of accounts owned and selected by user 102.

Although the process 200 is described with reference to the elements included in network configuration 100 of FIG. 1, this or a similar process may be performed in another, similar network configuration. For instance, network configuration 100 may include multiple secondary institutions (not shown) and their servers (not shown) supporting network-accessible accounts. Program 116 can generate (216) a list of these secondary institutions with network-accessible accounts and display (218) this list to user 102. The screens discussed with reference to FIGS. 3–9 are not limited to any particular layout or configuration. For example, manipulation tools such as pull-down menus, tabs, buttons, selection boxes, and scrollbars can be implemented using any similar type of manipulation tool. In another example, the graphs can be presented in any graph format (e.g., bar, line, pie, etc.) and with any orientation (e.g., with horizontal or vertical bars). Further, two or more screens can be combined and presented on a single screen. Program 116 can also create and display additional screens.

As described above, process 200 automatically collects (210) personalization data about user 102. This is information normally available to institution 122 that manages accounts for user 102. This automatically-collected personalization data can include the name, and address of user 102. The address defines a geographic location for user 102. This personalization data also can include the type of client computer 108 and the operating system of client computer 108 that user 102 uses to access network-accessible accounts. This data describing the type of client computer 108 and its operating system is normally available to server 104 using standard network protocols such as TCP/IP. In the case of network protocols such as TCP/IP, server 104 can also access the history of web navigation for client computer 108. In the case when institution 122 is a financial institution, the personalization data can include account balances. This personalization data is typically stored in data table 130.

As described above, process 200 can also provide (212) a manual personalization test to user 102. This test asks user 102 multiple choice or "fill in the blank" questions to collect data about the user so that process 200 can generate (216) a list of institutions that might manage accounts owned by user 102. These questions include questions such as what are your hobbies, what is your profession, who is your employer, what is your employer's stock symbol, what is your age, and who is your Internet Service Provider (ISP). The answers to the questions are then collected (214) and stored by program 116 in database 118 in data table 132.

As described above, process 200 generates (216) a list of other institutions managing network-accessible accounts that might be owned by user 102 from personalization data about the customer and rule set stored in data table 126. This generation is done by categorizing all of the institutions with network-accessible accounts that are known to process 200 in data table 125 and applying rules to determine which of these institutions should be displayed to user 102. This personalization data can include automatically-collected data as well as data from the manual personalization test entered by user 102.

Process 200 generates (216) this list of institutions to present to user 102 by applying the rule set stored in data table 126 to the personalization data. These rules are stored in database 118 in section 122. The rules take the form of IF [condition] THEN [action]. The condition portion of these rules looks at the existence of some data in the personalization data for user 102. In some implementations, these rules are applied to the personalization data in data tables 130 and 132 in two or more iterations.

In one iteration, program 116 applies a portion of the rules in data table 126 to filter down the list of institutions in data table 125 to sublists of institutions for different categories of institutions and these sublists are stored in data table 134. These categories can include, for example, banking, insurance, email, investments, direct billers, calendars, credit cards, and loans and mortgage.

In some implementations, in another iteration, the action portion of these rules assigns a score to one or more institutions on the list of other institutions in data table 125. In some implementations, program 116 simply checks all of the conditions of these rules against the personalization data for user 102 and assigns scores to the list of other institutions. The highest scoring institutions in the overall list get placed in the list displayed (218) to user 102. The conditions for these rules include statements such as "hobby is swimming" or "zip code is 12453". The actions for these rules include statements such as "add 10 to score of institution Bank_B" or "add 20 to score of institution Email_A".

In other implementations, in the other iteration, the action portion of these rules does not score institutions but simply states which institutions are to be displayed. For instance, a rule might state that if a zip code was between 019XX and 029XX, display banks Bank_A, Bank_B Online, and eight of the top ranked institutions in the bank category sublist in data table 134.

These rules are developed based on the needs of institution 122 and user 102. One consideration is that institution 122 is motivated to encourage user 102 to use network-accessible accounts of institutions that have partnerships with institution 122. This can result in rules that assign higher scores to institutions having partnerships with institution 122.

Another consideration is that as user 102 adds more accounts to his or her comprehensive view of accounts, institution 122 obtains more information about accounts that are managed by other institutions 124 and are owned by their customers. Such records may help institution 122 cater and offer new services to particular customers. For instance, in the case of financial institutions, if institution 122 knows that user 102 has a large balance in a financial account managed by competing institution 124, institution 122 can offer a deal to user 102 to manage this financial account for user 102 that offers better terms than institution 124. Thus, where institution 122 is a financial institution, the rules can assign higher scores to competing financial institutions. Program 116 orders the list of institutions by the sum of the scores assigned by these rules.

Program 116 uses personalization data, both automatically collected as well as from the personalization test, to make inferences about the kinds of accounts user 102 is likely to have. The rules are designed to make these inferences. In the general case, a rule incorporates the assumption that if a group of users has been defined to have a given characteristic and these users typically have accounts with a given institution. Using this assumption, if user 102 also has this characteristic, it is probable that user 102 also has one or more accounts with the given institution. So program 116, using these rules, displays those institutions to user 102 for which user 102 has matching characteristics and user 102 simply selects the institutions that provide accounts owned by or associated with user 102. This is more efficient than presenting all of the institutions in a long list to user 102. These characteristics include geographic location, type of computer or operating system user 102 uses, pattern of web navigation (that can be matched against the user's history of web navigation), and amount of money in financial accounts. Specific geographic locations are used to give higher scores to institutions that are local to the geographic locations. For instance, certain banks with network-accessible accounts are local to certain geographic locations. Furthermore, certain airlines with network-accessible frequent flier accounts are local to specific geographic locations. The type of computer or operating system is used to give higher scores to institutions that cater to these types of computers or operating systems. For instance, there are institutions providing email accounts that cater to users of specific types of computers such as Apple Macintosh® or operating systems such as Microsoft Windows®. Pattern of web navigation by user 102 can be used to determine if user 102 has visited web sites of institutions with network accessible accounts. If so, the rules can give higher scores to these institutions because it is probable that user 102 has accounts with these institutions. Other rules can incorporate the assumption that if user 102 has accounts with a balance higher than a given threshold, user 102 may own accounts provided by institutions that cater to wealthy individuals.

In other examples, institution 122 is a financial institution that provides retirement saving services to a client company. In this case, the client company can wish to have a comprehensive view of accounts available to employees. Institution 122 provides the list of institutions based on the needs of the client company. For example, the client company can program the set of rules in database 118 in section 122 to give institutions associated with the client company high scores. Since employees of the client company may have many accounts with these institutions, configuring the institution list in this fashion makes the account wizard more convenient for employees.

The techniques described here are not limited to any particular hardware or software configuration; they may find applicability in any computing or processing environment. The techniques may be implemented in hardware, software, or a combination of the two. The techniques may be implemented in programs executing on programmable machines such as mobile or stationary computers, personal digital assistants, and similar devices that each include a processor, a storage medium readable by the processor (including volatile and non-volatile memory and/or storage elements), at least one input device, and one or more output devices. Program code is applied to data entered using the input device to perform the functions described and to generate output information. The output information is applied to one or more output devices.

Each program may be implemented in a high level procedural or object oriented programming language to communicate with a machine system. However, the programs can be implemented in assembly or machine language, if desired. In any case, the language may be a compiled or interpreted language.

Each such program may be stored on a storage medium or device, e.g., compact disc read only memory (CD-ROM), hard disk, magnetic diskette, or similar medium or device, that is readable by a general or special purpose programmable machine for configuring and operating the machine when the storage medium or device is read by the computer to perform the procedures described in this document. The system may also be implemented as a machine-readable storage medium, configured with a program, where the storage medium so configured causes a machine to operate in a specific and predefined manner.

A number of embodiments of the invention have been described. Nevertheless, it will be understood that various modifications may be made without departing from the spirit and scope of the invention. Accordingly, other embodiments are within the scope of the following claims.

What is claimed is:

1. A method comprising:
   collecting personalization data about a user having a network-accessible account on a server of a first institution;
   automatically generating from a list of institutions maintained by the server of the first institution, based on the personalization data about the user, a list of one or more other institutions that provide network-accessible accounts with whom the user is likely to have accounts, wherein the accounts are not provided by the first institution;
   presenting the user the list of one or more other institutions on a user-interface;
   receiving from the user at least one second institution chosen from the list of one or more other institutions selected from the list of institutions;
   receiving from the user access infonnation for at least one network-accessible account that is provided by the at least one chosen second institution; and
   adding the at least one network-accessible account to an aggregation of accounts, the aggregation of accounts being displayed on the user-interface.

2. The method of claim 1 wherein the personalization data includes a characteristic shared by a pre-defined group of users.

3. The method of claim 2 wherein the characteristic comprises one of a geographical location, a type of computer, a type of operating system, a pattern of web navigation, and an amount of money in a fin ancial account.

4. The method of claim 1 wherein determining the personalization data further comprises: providing a personalization test to the user; and analyzing one or more answers of the user from the personalization test.

5. The method of claim 1 wherein collecting the personalization data further comprises automatically collecting characteristic associated with the user.

6. The method of claim 1 wherein receiving from the user at least one second institutions further comprises displaying the one or more likly institutions to the user as a sub-list of institutions.

7. The method of claim 1 wherein generating from the list of institutions further comprises determining one or more institutions that have a relation to the first institution.

8. The method of claim 7 wherein detennining one or more institutions that have a relation to the first entity further comprises:
   identifying the one or more institutions that have the relation to the first instutuion; and
   ordering the one or more institutions based on the relation.

9. The method of claim 7 wherein the relation comprises comnetitor.

10. The method of claim 7 wherein the relation comprises a partnership.

11. The method of claim 1 wherein the access information comprises:
    a user identifier for the account; and
    an account authenticator.

12. The method of claim 1 wherein the access information for the network-accessible account makes the network-accessible account automatically accessible over a network.

13. The method of claim 1 wherein the data about the user comprises at least one of a name, a geographic location, a computer system used by the user, and a history of web-navigation.

14. The method of claim 1 further comprising providing one or more accounts to the user.

15. The method of claim 14 wherein the personalization date about the user comprises information about the accounts provided by the first institution.

16. The method of claim 15 wherein the information comprises a balance of a first account provided by the first institution.

17. The method of claim 1 further comprising:
    receiving from the user a selected first account provided by the first institution; and adding the first account to the aggregation of accounts.

18. The method of claim 1 wherein the first institution comprises a financial institution, the method further comprising providing, by the first institution, one or more financial accounts to the user.

19. The method claim 1 wherein receiving from the user at least one second institution further comprises selecting a financial institution from the one or more other institutions that provide financial accounts.

20. The method of claim 1 wherein receiving from the user at least one second institution further comprises selecting institutions from the one or more other institutions selected from the list of institutions that provide email accounts, frequent flier accounts, or calendar accounts.

21. The method of claim 1, wherein receiving from the user access information for the at least one network-accessible account causes data at the at least one network-accessible account to become available at the server of the first institution.

22. The method of claim 1, wherein automatically generating from the list of institutions one or more other institutions includes:
    applying rules to at least one of the personalization data about the user or more other institutions.

23. A system comprising:
    a server comprising at least one processor;
    a database managed by a first institution;
    a web page interface to the first server: and storage that stores a program comprising instructions that, when executed on the at least one processor, configure the server to:

access personalization data about a user from the database;

automatically generate from a list of institutions maintained by the first institution, based on the personalization data about the user, a list one or more other institutions that provide network-accessible accounts with whom the user is likely to have accounts, wherein the accounts are not provided by the first institution;

present to the user the list of one or more other institutions on the interface;

receive from the user at least one second institution chosen from the list of one or more other institutions selected from the list of institutions;

receive from the user access information for at least one network-accessible account that is provided by the at least one chosen second institution; and add the at least one network-accessible account to an aggregation of accounts, the aggregation of accounts being displayed on the interface.

24. The system of claim 23 wherein the program comprises farther instructions that further configure the server to:
provide a personalization test to the user; and
analyze one or more answers of the user from the personalization test.

25. The system of claim 24 wherein the personalization test includes a characteristic shared by a pre-defined group of users.

26. The system of claim 23 wherein the program comprises further instructions that further configure the server to:
display the one or more other institutions to the user as a sub-list of institutions.

27. The system of claim 26 wherein the program comprises further instruction that further configure the server to;
identify one or more institutions in the list whose business has a relation to the business of the first institution; and
prioritize the identified one or more institutions in the display of the sub-list.

28. The system of claim 27 wherein the relation comprises competitor.

29. The system of claim 27 wherein the relation comprises a partnership.

30. The system of claim 23 wherein the access information comprises:
a user identifier for the account; and
an account authenticator.

31. The system of claim 30 wherein the access information for the network-accessible account makes the network-accessible account automatically accessible over a network.

32. The system of claim 23 wherein the data about the user comprises at least one of a name, a geographic location, a computer system used by the user, and a history of web-navigation.

33. The system of claim 23 wheren the first institution provides one or more accounts to the user.

34. The system of claim 23 wherein the personalization data about the user comprises information about the accounts provided by the first institution.

35. The system of claim 34 wherein the information comprises a balance of a first account provided by the first institution.

36. The system of claim 23 wherein the program comprises further instructions that further configure the server to;
receive from the user a selected first account from the accounts provided by the first institution; and
add the first account to the aggregation of accounts.

37. The system of claim 23 wherein the first institution comprises a financial institution and the first institution provides one or more financial accounts to the user.

38. The system of claim 23 wherein the instructions that configure the server to receive from the user at least one second institution further comprise instructions that configure the server to select a financial institution from the one or more other institutions that provide financial accounts.

39. The system of claim 23 wherein the instructions that configure the server to receive from the user at east one second institution further comprise instructions that configure the server to select from the one or more other institutions selected from the list of institutions that provide email accounts, frequent flier accounts, or calendar accounts.

40. The system of claim 23, wherein, the program instructions that configure the server to receive from the user access information for at least one network-accessible account further comprise instructions that configure the server to cause data at the at least one network-accessible account to become available at the server of the first institution.

41. The system of claim 23, wherein the program instructions that configure the server to automatically generate from the list of institutions one or more other institutions further comprise instructions that configure the server to:
apply rule to at least one of the personalization data about the user and the list of institutions, the rules defining conditions to generate the one or more other institutions.

42. An article comprising a machine-readable storage medium storing instructions operable to cause one or more machines to perform operations comprising:
collecting personalization data about user having a network-accessible account on a server of a first institution;
automatically generating from a list of institutions maintained by the server of a first institution, based on the personalization data about the user, a list of one or more other institutions that provide network-accessible accounts with whom the user is likely to have accounts, wherein the accounts are not provided by the first institution
presenting to the user the list of one or more other institutions on a user-interfirce;
receivng from the user at least one second institution chosen from the one or more other institutions selected from the list of institutions;
receiving from the user access information for at least one network-accessible account that is provided by the at least one chosen second institution; and
adding the at least one network-accessible account to an aggregation of accounts, the aggregation of accounts being displayed on the user-interface.

* * * * *